(12) United States Patent
Kageyama et al.

(10) Patent No.: US 9,294,695 B2
(45) Date of Patent: Mar. 22, 2016

(54) IMAGE PROCESSING APPARATUS, IMAGE PICKUP APPARATUS, AND STORAGE MEDIUM FOR GENERATING A COLOR IMAGE

(71) Applicant: Clarion Co., Ltd., Saitama (JP)

(72) Inventors: Masahiro Kageyama, Tokyo (JP); Teruki Takahashi, Saitama (JP); Takashi Tsutsui, Saitama (JP)

(73) Assignee: CLARION CO., LTD., Saitama (JP)

( * ) Notice: Subject to any disclaimer, the term of this patent is extended or adjusted under 35 U.S.C. 154(b) by 29 days.

(21) Appl. No.: 14/355,256

(22) PCT Filed: Oct. 3, 2012

(86) PCT No.: PCT/JP2012/075694
§ 371 (c)(1),
(2) Date: Apr. 30, 2014

(87) PCT Pub. No.: WO2013/065442
PCT Pub. Date: May 10, 2013

(65) Prior Publication Data
US 2014/0313369 A1    Oct. 23, 2014

(30) Foreign Application Priority Data
Nov. 1, 2011  (JP) .................................. 2011-240672

(51) Int. Cl.
*H04N 5/355* (2011.01)
*H04N 5/232* (2006.01)
(Continued)

(52) U.S. Cl.
CPC ............ *H04N 5/35536* (2013.01); *G06T 5/007* (2013.01); *G06T 5/50* (2013.01);
(Continued)

(58) Field of Classification Search
None
See application file for complete search history.

(56) References Cited

U.S. PATENT DOCUMENTS

2001/0016064 A1    8/2001  Tsuruoka et al.
2006/0239579 A1*  10/2006  Ritter ........................... 382/274
(Continued)

FOREIGN PATENT DOCUMENTS

JP    2001-238128 A    8/2001
JP    2001-268345 A    9/2001
(Continued)

OTHER PUBLICATIONS

A. Mihal, "Enfuse—Fusing Multiple Images with Enfuse version 4.0-753b534c819d, Aug. 1, 2010," XP055190490.
(Continued)

*Primary Examiner* — Albert Cutler
(74) *Attorney, Agent, or Firm* — Baker Botts L.L.P.

(57) ABSTRACT

To generate a color image exhibiting few blocked-up colors or little color saturation. It is provided a image processing apparatus for processing an original image that is picked up, comprising: an image input part for inputting N original images having different exposure levels, where N is an integer of two or more, which are obtained by picking up images of the same subject in one of a simultaneous manner and a time-series manner; and a composite processing part for generating M output images, where M is an integer of one or more and less than N, by composing the N original images. The composite processing part compares color component signals in each corresponding pixel position with each other between the N original images, and sets the color component signal that produces a higher chroma as a color component signal in each pixel position of the output image.

12 Claims, 5 Drawing Sheets

(51) Int. Cl.
  *G06T 5/00*   (2006.01)
  *H04N 5/235*  (2006.01)
  *H04N 9/77*   (2006.01)
  *H04N 9/73*   (2006.01)
  *H04N 9/64*   (2006.01)
  *G06T 5/50*   (2006.01)
  *H04N 9/68*   (2006.01)
  *G06T 11/00*  (2006.01)
  *H04N 9/04*   (2006.01)

(52) U.S. Cl.
  CPC ........... *G06T 11/001* (2013.01); *H04N 5/2355* (2013.01); *H04N 5/2356* (2013.01); *H04N 5/23229* (2013.01); *H04N 5/35554* (2013.01); *H04N 5/35572* (2013.01); *H04N 9/045* (2013.01); *H04N 9/646* (2013.01); *H04N 9/68* (2013.01); *H04N 9/735* (2013.01); *H04N 9/77* (2013.01); *G06T 2207/10016* (2013.01); *G06T 2207/10024* (2013.01); *G06T 2207/10144* (2013.01); *G06T 2207/20012* (2013.01); *G06T 2207/20221* (2013.01); *G06T 2207/30232* (2013.01); *G06T 2207/30252* (2013.01); *H04N 5/35545* (2013.01)

(56) References Cited

U.S. PATENT DOCUMENTS

2008/0253646 A1   10/2008   Kobayashi
2009/0080791 A1*  3/2009    Chen et al. .................... 382/266
2011/0194850 A1   8/2011    Joo

FOREIGN PATENT DOCUMENTS

| JP | 2003-319404 A | 11/2003 |
| JP | 2004-208000 A | 7/2004 |
| JP | 3914810 B2 | 2/2007 |
| JP | 2009-65691 A | 3/2009 |
| WO | 2010/116922 A1 | 10/2010 |

OTHER PUBLICATIONS

T. Mertens et al., "Exposure Fusion," 15th Pacific Conference on Computer Graphics and Applications, IEEE, Oct. 29, 2007, pp. 382-390, XP031338475.

T. Kartalov et al., "A Real Time Algorithm for Exposure Fusion of Digital Images," Melecon 2010—2010 15th IEEE Mediterranean Electrotechnical Conference, IEEE, Apr. 26, 2010, pp. 641-646, XP031683329.

T. Kartalov et al., "Fully Automated Exposure Fusion Algorithm for Mobile Platforms" Image Processing (ICIP), 2011 18th IEEE International Conference, Sep. 11, 2011, pp. 361-364, XP032080483.

Extended European Search Report, mailed Jun. 5, 2015, which issued during the prosecution of European Patent Application No. 12846385.8, which corresponds to the present application.

Office Action, mailed Jul. 7, 2015, which issued during the prosecution of Japanese Patent Application No. 2011-240672, which corresponds to the present application.

* cited by examiner

IMAGE PROCESSING APPARATUS, IMAGE PICKUP APPARATUS, AND STORAGE MEDIUM FOR GENERATING A COLOR IMAGE

CLAIM OF PRIORITY

The present application claims priority from Japanese patent application JP 2011-240672 filed on Nov. 1, 2011, the content of which is hereby incorporated by reference into this application.

BACKGROUND OF THE INVENTION

This invention relates to a technology for generating a color image.

In recent years, research and development have been actively carried out in order to photograph a nighttime scene with an on-vehicle camera, a surveillance camera, or the like and make use thereof for safety and security of people's lives. Such a nighttime scene exhibits an extremely large contrast, and exceeds a limit of a dynamic range of a general image pickup element, which may generally cause a phenomenon called "blown-out highlights", "blocked-up shadows", or "color saturation". In particular, in a case where a color (chromaticity) of a subject is used for image recognition processing or the like after photographing, when only a component of a specific color among color components such as red (R), green (G), and blue (B) is saturated, the color of a resultant image differs from an actual color of the subject, which may inhibit the color image from being formed appropriately. For example, when a red lamp existing within the subject is increased in luminance, the red component within the image is saturated. Then, the green component and the blue component increase relatively within the image, and hence a part corresponding to the red lamp appears whitish within the generated image.

In contrast, in International Publication No. WO 2010/116922 A1, there is disclosed a technology intended to provide an image input device capable of obtaining information necessary to create an appropriate color image even when the component of a specific color is saturated. In this technology, an image Img2 obtained by photographing with a first shutter speed and an image Img1 obtained by photographing with a second shutter speed higher than the first shutter speed are obtained. In those images, coordinates are compared between a saturated pixel within the image Img2 and a high luminance pixel within the image Img1. When those pixels are in the same coordinate position, it is estimated that the same subject has been photographed, and a chromaticity included in a signal from the saturated pixel having the same coordinates within the image Img2 is adjusted by using the following expressions so as to match with a chromaticity included in a signal from the high luminance pixel within the image Img1.

In other words, when a luminance signal of the high luminance pixel of a color image Img1 is set as Y1(x,y), color difference signals are set as Cb1(x,y) and Cr1(x,y), and a luminance signal output from the saturated pixel of a color image Img2 is set as Y2(x,y), corrected color difference signals Cb2'(x,y) and Cr2'(x,y) are calculated by using the following expressions.

$$Cb2'(x,y) = Cb1(x,y) \times Y2(x,y)/Y1(x,y) \quad (1)$$

$$Cr2'(x,y) = Cr1(x,y) \times Y2(x,y)/Y1(x,y) \quad (2)$$

In other words, WO 2010/116922 A1 discloses a technology for replacing the color difference signal within the color image signal output from the saturated pixel within the color image Img1 with the above-mentioned corrected color difference signal. Here, (x,y) represents coordinates on an image pickup plane of an image pickup element.

Further, in Japanese Patent Application Laid-open No. 2003-319404 A, there is disclosed a technology for combining a plurality of images in order to enhance the dynamic range of an image pickup apparatus using an image pickup element such as a CCD. This technology discloses an image pickup apparatus including: indexing means for processing each of image signals of a plurality of original images obtained by applying different exposure amounts and calculating an index corresponding to the chromaticity for each divided region formed of at least one pixel; selecting means for selecting one image signal from among the image signals of a plurality of original signals for each divided region based on the index; and image means for generating one composite image signal from the selected image signals.

Japanese Patent Application Laid-open No. 2003-319404 A also discloses that, at this time, an index C used for selecting one image signal from among the image signals of the plurality of original signals for each divided region is calculated from any one of Expressions (3) to (5) by using a luminance signal Y, color difference signals R−Y and B−Y, a luminance signal Y' of another image to be compared, and a predetermined value α.

$$C = \{(R-Y)^2 + (B-Y)^2\}/(Y+\alpha)^2 \quad (3)$$

$$C = \{(R-Y)^2 + (B-Y)^2\} \times (Y'+\alpha)^2 \quad (4)$$

$$C = \{|R-Y| + |B-Y|\}/(Y'+\alpha)^2 \quad (5)$$

SUMMARY OF THE INVENTION

In the above-mentioned related art, as indicated in Expressions (1) to (5), division (/) and multiplication (×) are used for operational expressions. When the division (/) and multiplication (×) are processed in a software manner by a processor (central processing unit; CPU) having low computing power, much time is necessary for processing, which causes a problem in that, for example, real-time processing cannot be performed, the number of image frames per unit time (for example, per second) needs to be reduced, or precision of another arithmetic operation (for example, image recognition processing) needs to be lowered. Alternatively, when a processor having high computing power or dedicated hardware is used, a cost of an entire apparatus increases.

It is an object of this invention to provide a technology capable of generating a color image exhibiting few blocked-up colors or little color saturation with a smaller information processing amount even when a subject exhibiting a high contrast is photographed.

The representative one of inventions disclosed in this application is outlined as follows. There is provided an image processing apparatus for processing an original image that is picked up, comprising: an image input part for inputting N original images having different exposure levels, where N is an integer of two or more, which are obtained by picking up images of the same subject in one of a simultaneous manner and a time-series manner; and a composite processing part for generating M output images, where M is an integer of one or more and less than N, by composing the N original images. The composite processing part compares color component signals in each corresponding pixel position with each other between the N original images, and sets the color component signal that produces a higher chroma as a color component signal in each pixel position of the output image.

According to one embodiment of this invention, it is possible to generate the color image exhibiting few blocked-up colors or little color saturation with a smaller information processing amount even when the subject exhibiting a high contrast is photographed. Therefore, it is possible to realize processing using a processor having lower performance and image generating processing with higher speed.

Other objects, configurations, and effects other than those described above become apparent in the following descriptions of embodiments.

DETAILED DESCRIPTION OF THE PREFERRED EMBODIMENTS

Figure 1:
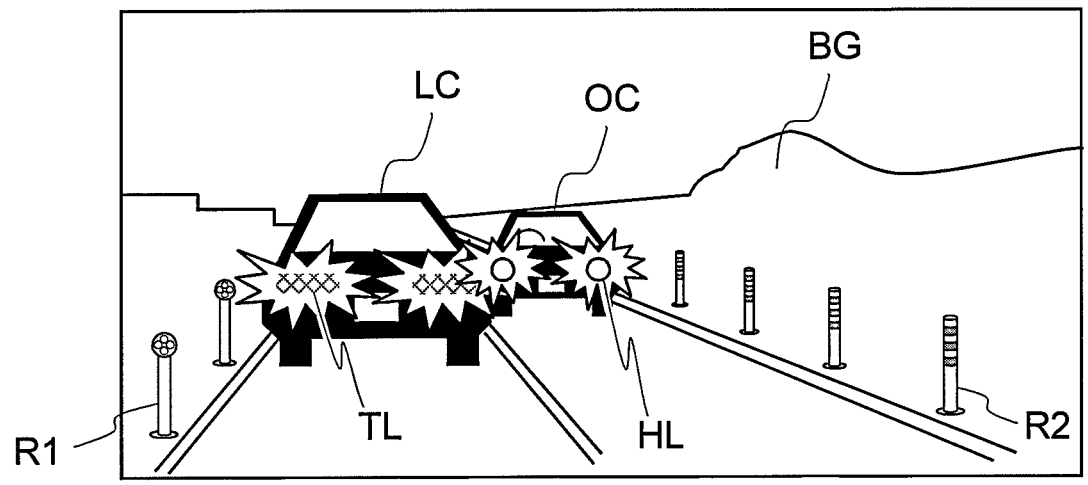
FIG. 1 is a diagram illustrating an example in which a subject having a relatively wide luminance range exists in a field.

First, an example in which a subject having a relatively wide luminance range exists in a field is described with reference to FIG. 1. FIG. 1 is a diagram illustrating an image obtained by photographing a nighttime road by using an on-vehicle camera or a surveillance camera. In the following description, the vehicle to which the on-vehicle camera is mounted is referred to as "own vehicle", the vehicle that travels in front of the own vehicle is referred to as "leading vehicle", and the vehicle that travels toward the own vehicle from the opposite direction is referred to as "oncoming vehicle". FIG. 1 illustrates a situation in which a leading vehicle LC and an oncoming vehicle OC exist in a photographed scene together with a background BG, reflecting devices R1 and R2 set on roadsides, and the like. The leading vehicle LC has taillights TL thereof in a lit state. The oncoming vehicle OC has headlights HL thereof in a lit state. The reflecting devices R1 and R2 reflect light and the like from the headlights of the own vehicle and the vehicle that travels behind the own vehicle, to emit light of a color close to a range between a yellow color and an orange color.

A description is made with attention focused on the image of a taillight TL part of the leading vehicle. When a following distance between the leading vehicle and the own vehicle is relatively long, a pixel value corresponding to an image part of the taillight TL generated by being captured by the on-vehicle camera does not become saturated. However, the following distance between the own vehicle and the leading vehicle becomes close enough, the luminance of the taillight TL part increases in the entire photographed scene. The exit light from the taillights TL has a red (R) color component more than a green (G) color component and a blue (B) color component, and hence the R color component becomes saturated soon after the taillight TL part increases in the luminance. Particularly in a nighttime scene, the contrast is extremely large, and when an exposure amount is defined with reference to the luminance of the background BG or the like, it is more probable that the image part corresponding to light emitted from a light source provided to the vehicle near the own vehicle becomes saturated.

Figure 2:
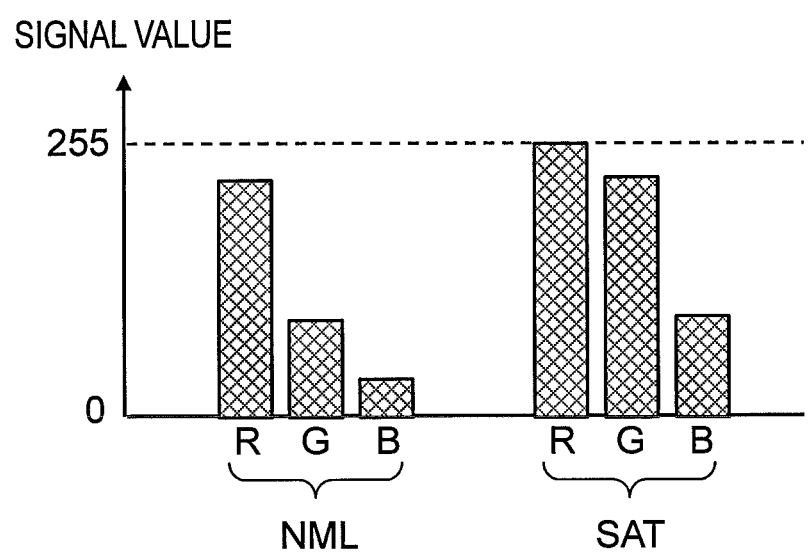
FIG. 2 is a bar chart illustrating an example of an RGB image signal in which a color value is not saturated and an RGB image signal in which a color value is saturated.

Such a situation is shown in FIG. 2. In FIG. 2, the vertical axis indicates an 8-bit pixel value (minimum value: zero; maximum value: 255), and the horizontal axis indicates the respective components of the R color, the G color, and the B color. In FIG. 2, a combination of pixel values denoted by reference symbol NML indicates an example of a state in which no pixel value is saturated, and a combination of pixel values denoted by reference symbol SAT indicates an example of a state in which the pixel value of the R color is saturated. In the following description, those combinations of pixel values are referred to as "pixel value NML" and "pixel value SAT". In the pixel values NML, the R color component is relatively large, and the image based on those pixel values is red. On the other hand, in the pixel values SAT, the R color component is saturated, and the components of the G color and the B color relatively increase. As a result, redness is reduced even in the image to be originally reproduced in red color, and in the example shown in FIG. 2, the color reproduced based on the pixel values SAT is a yellow color close to white.

In a case where the color tint greatly shifts from an actual color, it is difficult to make a correct determination or discrimination with color taken into consideration when image recognition is performed. For example, for the purpose of determining presence/absence of the taillights (of the leading vehicle) within the photographed scene or the purpose of discriminating between the reflecting devices (R1 and R2) and the taillights (of the leading vehicle), the correct determination or discrimination is difficult because the determination or discrimination based on color cannot be performed when blown-out highlights or color saturation occurs. Here, the blown-out highlights means that the pixel values in all channels of the R color, the G color, and the B color are saturated or nearly saturated. The color saturation means that the pixel value in a channel of a specific color is saturated.

As described above, when a scene having a wide range of a subject luminance is photographed, some luminances within the scene fall out of a dynamic range of an image pickup element, which easily causes the blown-out highlights or the color saturation. When the exposure amount is reduced in order to suppress the blown-out highlights or the color saturation, a pixel value having a sufficient magnitude in turn cannot be obtained in a low luminance part within the field, which blocks up shadows, and it is therefore difficult to perform image recognition processing based on a contour, a color, or the like of an object. In order to handle this problem, in an embodiment of this invention, a plurality of images obtained by photographing the same subject with different exposure levels are subjected to composite processing.

First Embodiment

Figure 3:
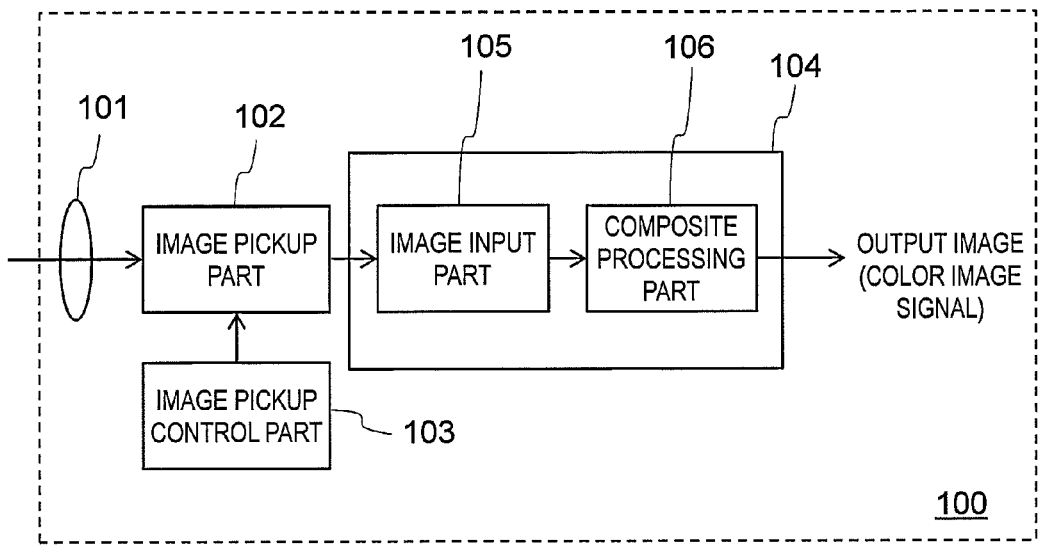
FIG. 3 is a block diagram schematically illustrating a configuration of an image processing apparatus and an image pickup apparatus including an image processing apparatus according to a first embodiment of this invention.

FIG. 3 is a block diagram illustrating an example in which an image processing apparatus 104 according to a first embodiment of this invention is included in an image pickup apparatus 100. The image pickup apparatus 100 includes a photographing lens 101, an image pickup part 102, an image pickup control part 103, and the image processing apparatus 104. The image processing apparatus 104 includes an image input part 105 and a composite processing part 106. The following description is made on the assumption that the above-mentioned components are integrally formed, but a camera unit formed of the photographing lens 101, the image pickup part 102, and the image pickup control part 103 may be formed separately from the image processing apparatus 104. The photographing lens 101 may be fixed to the camera unit, or may be removably mounted to the camera unit so as to be interchangeable to any one of various types of photographing lens depending on the purpose. The image processing apparatus 104 may be formed by dedicated hardware, or may be formed of a computer including a CPU, a memory, and a storage apparatus and a program executed by the computer. In that case, the program is stored in a computer-readable non-transitory medium such as an optical disc, a magnetic storage medium, or a flash memory. In addition, the computer includes an interface for reading the program from such a computer-readable medium.

The image pickup part 102 includes: an image pickup element such as a charge coupled device (CCD) image sensor or a complementary metal oxide semiconductor (CMOS) image sensor; and a preprocessor. In this embodiment, the image pickup element may be a single-panel CMOS image sensor on which an on-chip color filter having a Bayer layout of the respective colors of R, G, and B is formed on a light-receiving surface. The CMOS image sensor is configured to output a digital color filter array (CFA) image by incorporating an analog front-end such as a correlated double sampling (CDS) circuit, an automatic gain control (AGC) circuit, or an A/D converter circuit. The CFA image is an image having a signal value of one color per pixel before being subjected to demosaic processing. The CMOS image sensor also has an electronic shutter function. The preprocessor generates an RGB image by subjecting the CFA image to processing such as demosaicing, noise reduction, gradation correction, and white balance adjustment. It should be noted that the image pickup part 102 may be configured to output the CFA image by omitting the preprocessor, while the image processing apparatus 104 may perform processing including the demosaicing, the noise reduction, the gradation correction, and the white balance adjustment.

The photographing lens 101 forms a subject image on the light-receiving surface of the image pickup part 102. The photographing lens 101 may be a fixed-focal-length lens or may be a variable-focal-length lens. In a case of the variable-focal-length lens, a magnification drive apparatus for changing a focal length may be incorporated into the photographing lens 101. Further, a focus control apparatus for driving a lens for focus control may be incorporated into the photographing lens 101. The photographing lens 101 may be configured to be able to change a diaphragm value (F value) by incorporating a diaphragm apparatus.

The image pickup control part 103 controls a timing and the exposure amount of an image pickup operation performed by the image pickup part 102. In this embodiment, the image pickup control part 103 outputs a timing signal to the image pickup part 102 so that the image pickup operation is repeatedly performed by the image pickup part 102 at a frame rate of 30 frames per second, 60 frames per second, or the like. At this time, the image pickup control part 103 also outputs an exposure amount control signal to the image pickup part 102. The image pickup part 102 repeatedly picks up an image by changing the exposure level based on those signals output from the image pickup control part 103.

Here, a description is made of the exposure level. In general, a reference exposure amount (reference image plane exposure amount) to be applied to the image pickup element is determined based on a sensitivity of the image sensor, an amplification factor used by the analog front-end, a noise level, superiority or inferiority of noise reduction processing performed by a digital signal processing part, and the like. In general, the sensitivity that can be set by the image pickup element can be raised to a higher level as each pixel (photoelectric conversion part) that forms the image sensor becomes larger in size, as amplification becomes possible with a higher gain due to superior S/N ratios of the image sensor and the analog front-end, and as the noise reduction processing performed by the digital signal processing part becomes superior. In this manner, the sensitivity that can be set by the image pickup element changes based on various factors, and hence the sensitivity that can be set by the image pickup element is referred to as "system sensitivity" in this specification. As it becomes possible to raise the system sensitivity to a higher level, it becomes possible to reduce the reference exposure amount to a lower level. The exposure level is defined based on the set system sensitivity. A reference exposure level is defined so as to realize an average brightness in an image obtained by picking up the image of a subject exhibiting the average brightness.

When an image is picked up with the exposure level higher than the reference exposure level, a little too bright (overexposed) image is obtained. The little too bright image may cause the blown-out highlights or the color saturation in a bright part within the subject, but allows colors to be reproduced more vividly in a dark part within the subject. On the other hand, when an image is picked up with the exposure level lower than the reference exposure level, a little too dark (underexposed) image is obtained. The little too dark image may cause blocked-up shadows in the dark part within the subject, but can reduce a probability that the blown-out highlights or the color saturation is caused in the image corresponding to a bright part even when the bright part due to sunlight, artificial lighting, or the like exists within the subject.

Figure 4A:
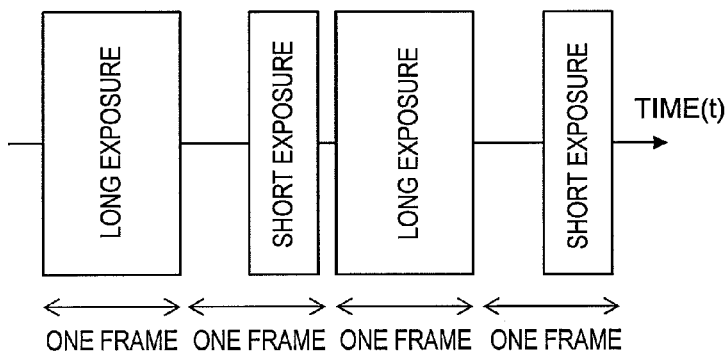
FIG. 4A is a diagram illustrating a method of obtaining images having different exposure levels in a simultaneous manner.

As a method of changing the exposure level, there are a method of changing the diaphragm of the photographing lens 101, a method of changing an exposure time used by the image pickup part 102, and the like. When a plurality of images having different exposure levels are obtained, a plurality of images having different exposure amounts cannot be simultaneously obtained with the method of changing the diaphragm or the exposure time, and hence it is necessary to change one or both of the diaphragm and the exposure time while repeating the image pickup operation in time series. Alternatively, it is also possible to change a density of a variable optical density filter located before or after the photographing lens 101 while the diaphragm and the exposure time are fixed. With such a method, in order to obtain N (N: an integer of two or more) images having different exposure levels, the image pickup performed N times is periodically repeated in time series while changing the exposure level. FIG. 4A illustrates how the image pickup is repeated while the exposure level is alternately increased/decreased. In the example illustrated in FIG. 4A, in order to increase/decrease the exposure level, the exposure time is alternately changed to repeat an exposure for a longer exposure time (long exposure) and an exposure for a shorter exposure time (short exposure).

Further, when N sets of the photographing lens 101 and the image pickup part 102 are provided to the image pickup apparatus as a whole and are arrayed so as to capture the same subject, the N images having different exposure levels can be obtained substantially simultaneously by changing the exposure level for each of the sets.

Alternatively, when a plurality of kinds of pixel having different sensitivities are regularly arrayed on the light-receiving surface of the image pickup element in a mixed manner (here, for the sake of brevity of description, two kinds, high-sensitivity pixels and low-sensitivity pixels, are arrayed), the N (two in the above-mentioned example) images having different exposure levels can be simultaneously obtained in one exposure operation. This is because the reference image plane exposure amount is different between the high-sensitivity pixels and the low-sensitivity pixels, and hence the exposure level is different therebetween as a result of applying the same exposure amount to those high-sensitivity pixels and the low-sensitivity pixels. In addition, a beam splitter using a semi-transparent mirror, a prism, or the like may be located behind the photographing lens to guide the subject light to a plurality of image pickup elements with an unequal light amount ratio. By providing such a configuration, a plurality of images having different exposure levels can be obtained by substantially simultaneously performing exposures for substantially the same exposure time by the plurality of image pickup elements.

Figure 4B:
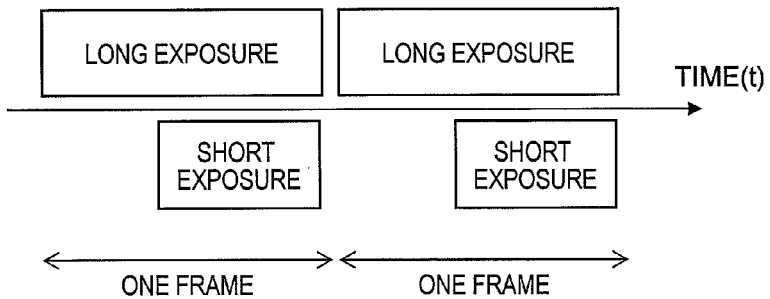
FIG. 4B is a diagram illustrating a method of obtaining images having different exposure levels in a time-series manner.

FIG. 4B illustrates how a plurality of exposures are performed substantially simultaneously at the different exposure levels. In the example illustrated in FIG. 4B, the plurality of exposures are performed substantially simultaneously with different exposure times. However, with the image pickup apparatus including a plurality of combination sets of the photographing lens and the image pickup element, the plurality of exposures can be performed substantially simultaneously for substantially the same exposure time by changing the diaphragm. Further, a plurality of images having different exposure levels can be obtained by performing the plurality of exposures substantially simultaneously for substantially the same exposure time by using the image pickup element including the high-sensitivity pixel and the low-sensitivity pixel or the plurality of image pickup elements to which the subject light is guided with an unequal light amount ratio.

For the purpose of picking up an image of the subject that moves relatively fast, it is desired that the plurality of images having different exposure levels can be obtained within as a short time as possible with the aim of improving a result of the composite processing performed later. This is because a position in which the subject appears within the image may change among the plurality of images obtained by photographing at different timings, which causes the composite processing performed later to be difficult.

The following description is made of an exemplary case of obtaining a plurality of images having different exposure levels by picking up images in time series while changing the exposure time (electronic shutter time) used by the image pickup part 102 for each frame. The image pickup control part 103 outputs a control signal to the image pickup part 102 so that an image is picked up at a frame rate of, for example, 60 frames per second by the image pickup part 102. At this time, the image pickup control part 103 issues the control signal to the image pickup part 102 so that the images having the different exposure levels are repeatedly picked up for each frame.

Figure 5:
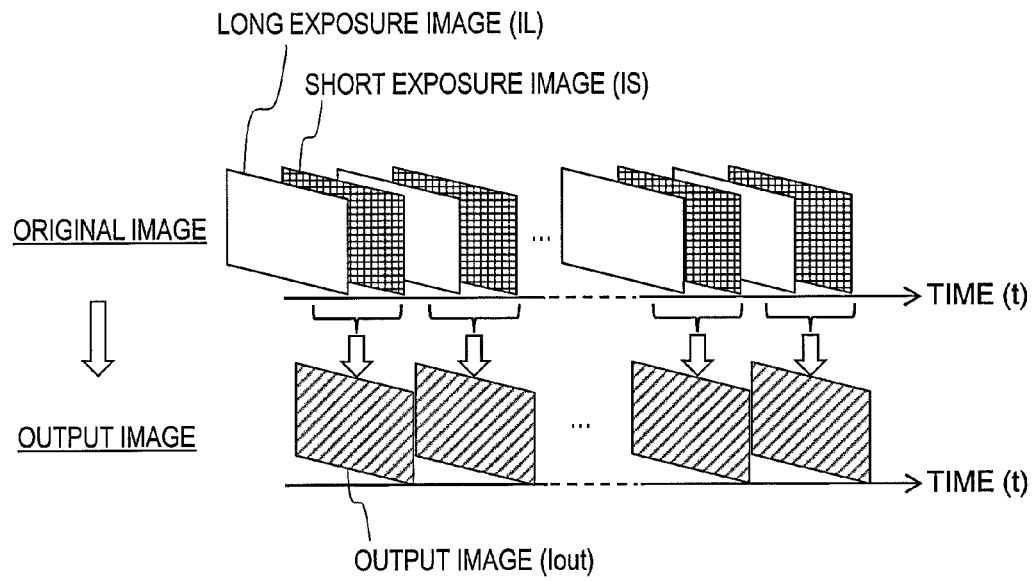
FIG. 5 is a diagram illustrating generation of an output image corresponding to a set of a plurality of original images by the image processing apparatus according to the first embodiment of this invention.

FIG. 5 illustrates an example of how the image pickup operation is performed with two different exposure levels by the image pickup part 102 to temporally alternately generate an image having a relatively high exposure level and an image having a relatively low exposure level. In this example, the length of the exposure time is changed in order to change the exposure level, and hence the image having a relatively high exposure level is referred to as "long exposure image (IL)", and the image having a relatively low exposure level is referred to as "short exposure image (IS)". The long exposure image (IL) and the short exposure image (IS) are sequentially input to the image input part 105 of the image processing apparatus 104, and processed by the composite processing part 106 to generate an output image (Tout). The long exposure image (IL) and the short exposure image (IS) input to the image input part 105, in other words, the images before the composite processing are each referred to as "original image" in this specification. In FIG. 5, the frame rate of the generated output image (Iout) is ½ of an image pickup frame rate.

The image input part 105 can be formed of a storage apparatus superior in access speed such as a synchronous dynamic random access memory (SDRAM). When the original images successively output from the image pickup part 102 are processed by the image processing apparatus 104 in real time, the image input part 105 inputs the original images output from the image pickup part 102. When the original images accumulated in a memory card, a hard disk drive, a solid state drive (SSD), or the like are processed by the image processing apparatus 104, the image input part 105 inputs the original images from a storage medium such as the memory card, the hard disk drive, or the SSD. As described above, the image input part 105 may input the CFA image as the original image, or may input the image after the demosaic processing. The following description is made on the assumption that the image input part 105 inputs the RGB image subjected to the demosaic processing.

The image input part 105 outputs N, in this example, two original images formed of the long exposure image (IL) and the short exposure image (IS) are output to the composite processing part 106 as a set. The composite processing part 106 performs the composite processing after converting each of the original images in an RGB color space into a signal including a luminance component signal and a color component signal. In this example, it is assumed that the composite processing part 106 converts the original image into a YUV signal as the signal including the luminance component signal and the color component signal. As the YUV signal, the image signal is expressed by Y, in other words, a luminance component and U and V, in other words, color difference components. Here, when the pixel values of the respective colors of the RGB image are set as (R,G,B) and when the pixel values indicated by the YUV signal are set as (Y,U,V), a YUV pixel value can be obtained from an RGB pixel value by using the following expressions.

$$Y=0.299 \times R+0.587 \times G+0.114 \times B \quad (6)$$

$$U=-0.169 \times R-0.331 \times G+0.500 \times B \quad (7)$$

$$V=0.500 \times R-0.419 \times G-0.081 \times B \quad (8)$$

By using Expressions (6) to (8), a luminance signal (Y) and a color difference signal (U,V) can be obtained so as to correspond to the pixel in each pixel position within the original image.

Further, in place of the YUV signal, it is possible to use the luminance signal (Y) and color difference signals (B−Y) and (R−Y) derived by using Expressions (9) to (11).

$$Y=0.300 \times R+0.590 \times G+0.110 \times B \quad (9)$$

$$B-Y=-0.300 \times R-0.590 \times G+0.890 \times B \quad (10)$$

$$R-Y=0.700 \times R-0.590 \times G-0.110 \times B \quad (11)$$

Further, in place of the YUV signal, it is possible to use the luminance signal (Y) and color difference signals (Cb and Cr) derived by using Expressions (12) to (14).

$$Y=0.257 \times R+0.504 \times G+0.098 \times B \quad (12)$$

$$Cb=-0.148 \times R-0.291 \times G+0.439 \times B \quad (13)$$

$$Cr=0.439 \times R-0.368 \times G-0.071 \times B \quad (14)$$

Further, as signals similar to YCbCr, it is possible to derive and use the luminance signal (Y) and color difference signals (Pb) and (Pr).

The following description is made on the assumption that the processing is performed by using the YUV signal. Here, a description is made of a relationship between the respective pixel values of (Y,U,V) and the reproduced color. For example, a description is made of a situation in which the following distance from the leading vehicle is reduced, and the image of the part of the taillight increases in brightness, which soon causes the color saturation or the blown-out highlights.

In the situation in which the image is not so bright as to cause the color saturation or the blown-out highlights, as the brightness of the image increases, the value of the luminance signal (Y) increases. At this time, absolute values of the color difference signal (U,V) also increase. For example, to describe the image of the part of the taillight TL of the leading vehicle LC, when the leading vehicle LC is spaced apart from the own vehicle and appears dark, the luminance signal (Y) of the image of the part has a small value, and the absolute values of the color difference signal (U,V) are also small. The color reproduced at this time is a little too dark red. Then, as the own vehicle approaches the leading vehicle LC, the brightness of the image of the part of the taillight (TL) increases, the value of the luminance signal (Y) and the absolute values of the color difference signal (U,V) also increase. In other words, the reproduced color changes from red taking on a black tint to vivid red having a high chroma.

However, when the image becomes even brighter to start causing the color saturation, the value of the luminance signal (Y) starts increasing, and the absolute values of the color difference signal (U,V) start decreasing. As the absolute values of the color difference signal (U,V) decrease, the color becomes lighter (chroma deteriorates). The color reproduced from the signals obtained at this time is different from the original color of the taillight due to a change in hue, the values of the color difference signal (U,V) soon come close to (0,0), and the color becomes whitish.

Further, to give consideration to the change in color reproduced when only the value of the luminance signal (Y) is changed with the absolute values of the color difference signal (U,V) fixed to constant values, the color becomes darker when the value of the luminance signal (Y) is smaller than in the opposite case. When, as the pixel values of (Y,U,V), only the value of Y is increased/decreased with appropriate values set as U and V, and when the pixel values of (R,G,B) corresponding to a combination of those pixel values are obtained (conversion expression from a YUV color space into the RGB color space is described later with reference to Expressions (17) to (19)), it is understood that, as the value of Y decreases, differences between the corresponding pixel values of (R,G,B) increase, and a chromaticity becomes clearer. For example, it can be expressed that, when two points corresponding to two colors are plotted on a two-dimensional plane defined based on the hue and the chroma, the chromaticity becomes clearer as those two points become apart from each other (distance between two points increases).

By using the above-mentioned nature, the composite processing part 106 performs the composite processing for the long exposure image (IL) and the short exposure image (IS) expressed in the YUV color space as described below. In the following description, in order to distinguish between the respective pixel values (Y,U,V) of the long exposure image (IL) and the short exposure image (IS), the pixel values of the long exposure image (IL) are set as (YL,UL,VL), and the pixel values of the short exposure image (IS) are set as (YS, US,VS). With regard to the long exposure image (IL) and the short exposure image (IS), the composite processing part 106 compares between the values (UL and US) and between the values (VL and VS) in a corresponding pixel position within the two images, and sequentially performs processing for obtaining the value having larger absolute values as output values (UO,VO) in the pixel position, for each of the pixels. At this time, the luminance value (YS) of the short exposure image (IS) is selected as a luminance value (YO).

Figure 6:
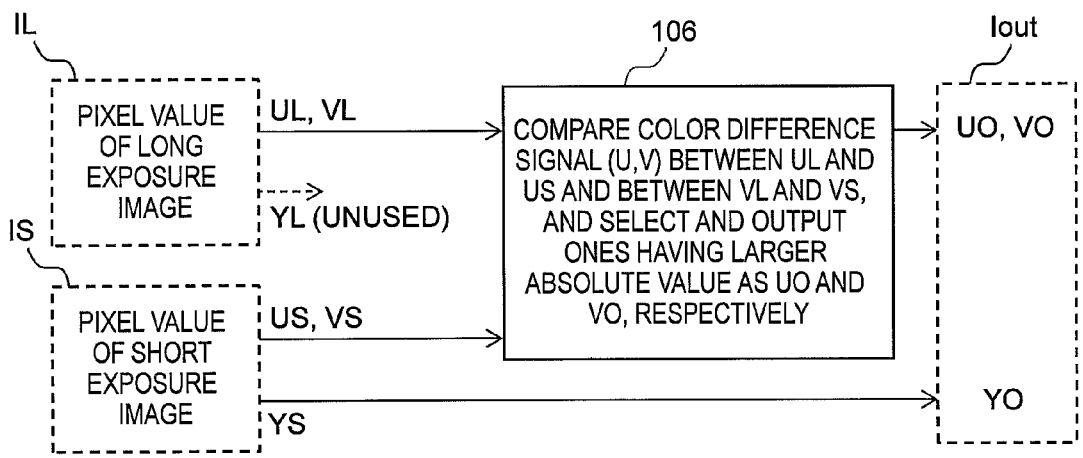
FIG. 6 is a diagram illustrating determining pixel values in each pixel position of the output image based on pixel values in each pixel position of two images having different exposure levels by the image processing apparatus according to the first embodiment of this invention.

FIG. 6 is a diagram conceptually illustrating how the output image (Iout) is generated from the long exposure image (IL) and the short exposure image (IS) as described above. In FIG. 6, the pixel values (UL,VL) extracted from the long exposure image (IL) and the pixel values (US,VS) extracted from the short exposure image (IS) are compared with each other by the composite processing part 106 between the pixel values UL and US and between the pixel values VL and VS. Then, the values having larger absolute values are selected to obtain the pixel values UO and VO of the output image Iout. Further, in this situation, the luminance value of the short exposure image IS is used as the luminance value YO of the output image Iout.

Figure 7:
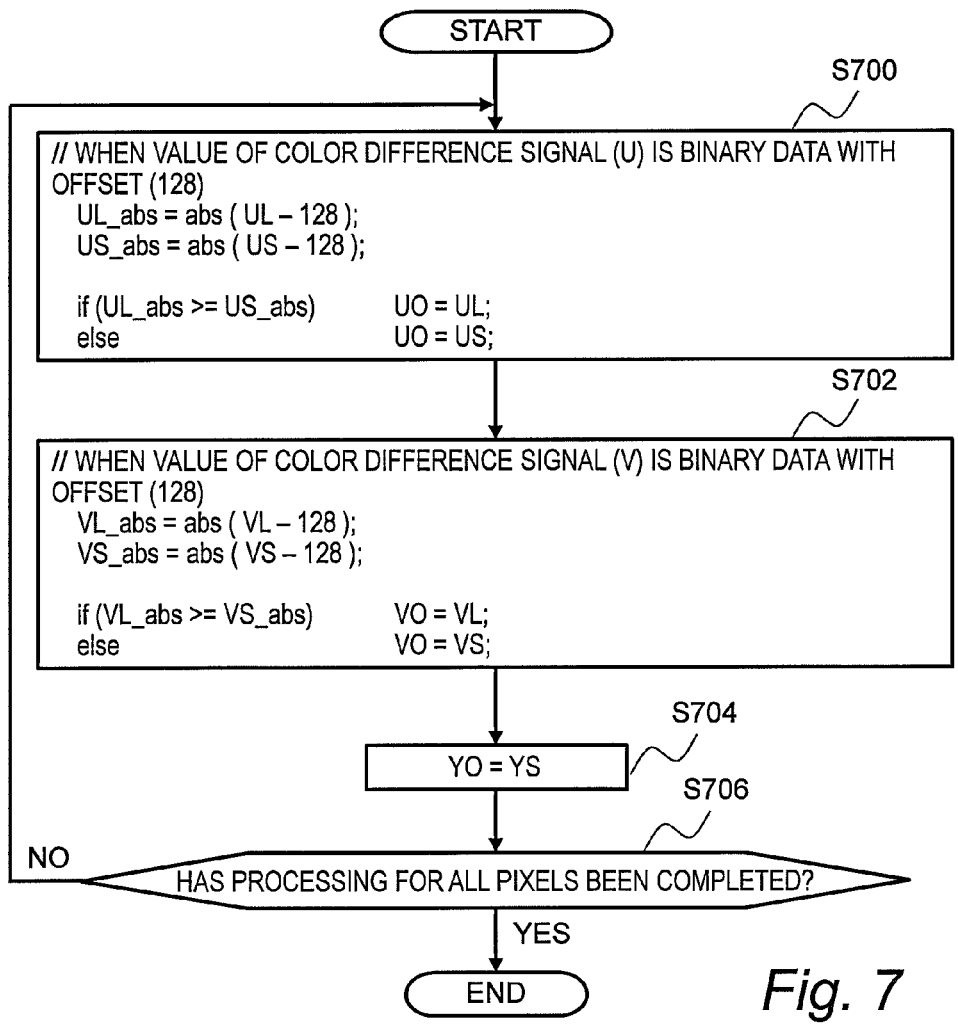
FIG. 7 is a flowchart illustrating image composite processing executed by the image processing apparatus according to the first embodiment of this invention.

FIG. 7 is a flowchart schematically illustrating a procedure for image composite processing executed by the composite processing part 106. When the processing illustrated in FIG. 7 is executed once, the output image Iout corresponding to one frame is generated by the composite processing part 106. In other words, when the output image Iout is generated at a frame rate of 30 frames per second, the processing illustrated in FIG. 7 is executed 30 times per second.

The processing illustrated in FIG. 7 indicates processing performed when the color difference signal (U,V) is binary data with offset (128). In other words, when the values of (Y,U,V) are derived by using Expressions (6) to (8) in terms of RGB image data having an 8-bit depth, a U value and a V value can assume negative values. Therefore, the U value and the V value can be handled as unsigned binary data by adding 128 equally to the derived U value and V value to obtain positive integers. "//when value of color difference signal (U) is binary data with offset (128)" described in Step S700 and "//when value of color difference signal (V) is binary data with offset (128)" described in Step S702 mean remarks within the program.

In Step S700, the composite processing part 106 subtracts an offset value of 128 from each of the values UL and US of the color difference between the long exposure image (IL) and the short exposure image (IS) in the pixel position to be processed, to obtain the absolute values thereof. In this manner, UL_abs and US_abs are obtained. Then, UL_abs and US_abs are compared with each other, and when it is determined that the value of UL_abs is equal to or larger than the value of US_abs, UO=UL is determined. On the other hand, when the value of UL_abs is below the value of US_abs, UO=US is determined. The details of this processing are indicated by the following program statements within the processing block of Step S700.

$$UL\_abs=abs(UL-128)$$

$$US\_abs=abs(US-128)$$

$$if(UL\_abs>=US\_abs)UO=UL$$

$$else\ UO=US \qquad (15)$$

In Step S702, the composite processing part 106 subtracts an offset value of 128 from each of the values VL and VS of the color difference between the long exposure image (IL) and the short exposure image (IS) in the pixel position to be processed, to obtain the absolute values thereof. In this manner, VL_abs and VS_abs are obtained. Then, VL_abs and VS_abs are compared with each other, and when it is determined that the value of VL_abs is equal to or larger than the value of VS_abs, VO=VL is determined. On the other hand, when the value of VL_abs is below the value of VS_abs, VO=VS is determined. The details of this processing are indicated by the following program statements within the processing block of Step S702.

$$VL\_abs=abs(VL-128)$$

$$VS\_abs=abs(VS-128)$$

$$if(VL\_abs>=VS\_abs)VO=VL$$

$$else\ VO=VS \qquad (16)$$

In Step S704, the composite processing part 106 sets the value (YS) of the luminance in the pixel position to be processed within the short exposure image (IS) as the value YO of the luminance of the output image (Iout).

The composite processing part 106 determines in Step S706 whether or not the processing has been completed for all the pixels within the image corresponding to one frame, and repeatedly performs the above-mentioned processing from Step S700 to Step S704 until the determination of Step S706 results in yes. When the determination of Step S706 results in yes, the processing for generating the output image (Iout) corresponding to one frame is brought to an end.

The processings of Steps S700, S702, and S704 described above do not need to follow the order exemplified in FIG. 7, and can be changed in processing order.

As described above, according to the first embodiment of this invention, the use of division (/) and multiplication (×) is reduced, and the output image can be generated by the processing for absolute value operation (abs), subtraction (−), and condition branch (if), which can reduce a processing load on the processor. Alternatively, it is possible to improve processing speed with a processor having the same processing performance. In addition, by simple processing, accuracy of the discrimination can be improved when the generated output image is subjected to processing such as image recognition and the discrimination of the subject is performed based on the color difference. For example, in an applied example of processing the image obtained by the on-vehicle camera to determine whether or not the taillight of the leading vehicle in a lit state exists, the light of the orange color from a turn-signal lamp (turn-signal), the reflecting device set on the roadside, or the like can be prevented from being erroneously determined as the taillight.

The above description is directed to the example in which two original images formed of the long exposure image (IL) and the short exposure image (IS) are input to the image processing apparatus 104 to be processed thereby. However, this invention is not limited thereto, and at least three original images corresponding to the output image corresponding to one frame may be input to be processed. At this time, with regard to the luminance component signal of the output image signal, it is desired that the luminance component signal included in the signal in each corresponding pixel position of one original image among (N−1) original images obtained by excluding the original image having the highest exposure level from N original images be set as the luminance component signal in each pixel position of the output image.

By increasing the number of original images, it is possible to generate the output image having a wide dynamic range corresponding to a wider luminance range of the subject. In that case, according to the first embodiment of this invention, the processing load of the processor can be reduced, which can increase the number of frames of the output image that can be generated per unit time.

Second Embodiment

Figure 8:
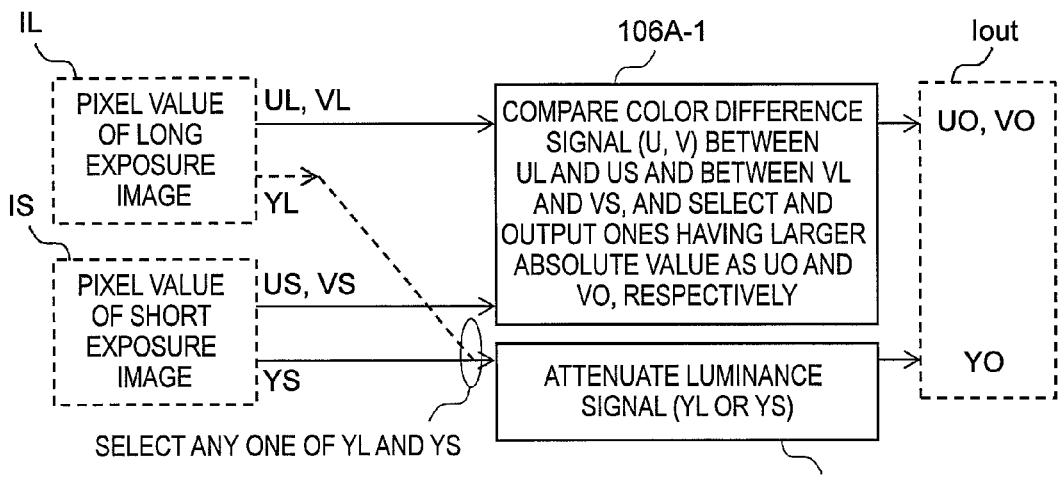
FIG. 8 is a diagram illustrating determining pixel values in each pixel position of an output image based on pixel values in each pixel position of two images having different exposure levels by image processing apparatus according to a second embodiment of this invention.

FIG. 8 illustrates an operation of a composite processing part 106A-1 of an image processing apparatus according to a second embodiment of this invention, and features thereof are described. The other components are the same as those described in the first embodiment, and hence descriptions thereof are omitted.

FIG. 8 is, similarly to FIG. 6, a diagram conceptually illustrating how the output image (Iout) is generated from the long exposure image (IL) and the short exposure image (IS). In FIG. 8, the pixel values (UL,VL) extracted from the long exposure image (IL) and the pixel values (US,VS) extracted from the short exposure image (IS) are compared with each other by the composite processing part 106A-1 between the pixel values UL and US and between the pixel values VL and VS. Then, the values having larger absolute values are selected to generate the pixel values UO and VO of the output image Tout. This point is the same as the processing performed by the composite processing part 106 according to the first embodiment. The second embodiment is different from the first embodiment in that any one of the luminance values (YL and YS) that is selected from the luminance value YL of the long exposure image (IL) and the luminance value YS of the short exposure image (IS) is used as the luminance value YO of the output image Iout. The second embodiment is also different from the first embodiment in that the luminance values YL and YS are attenuated by a composite processing part 106A-2 with an attenuation ratio determined based on whether the used luminance value is YL or YS.

As described above, the respective absolute values of a color difference signal (UL,VL) of the long exposure image and the color difference signal (US,VS) of the short exposure image are compared in terms of each of U and V for each pixel, and a color difference signal having larger absolute values is output as (UO,VO). At this time, when a luminance signal (YL or YS) is output as a luminance signal (YO) as it is, the following problem may occur. In other words, when the output signal (YO,UO,VO) is substituted into Expressions (17) to (19) that are inverse functions of Expressions (6) to (8) to derive the values of (R,G,B), at least any one of those values may become 255 or more or below zero to be saturated. For example, when the image in the YUV color space output from the composite processing part 106A is again converted into the image in the RGB color space to be subjected to another processing, the above-mentioned saturation becomes a problem.

Therefore, for example, processing for multiplying the luminance signal YL or YS by a fixed coefficient smaller than one is performed to attenuate a luminance signal value (106A-1), and the resultant is set as the luminance signal (YO) of the output image (Tout), to thereby be able to avoid the saturation of (R,G,B). It should be noted that the fixed coefficient may be set to an appropriate value in accordance with actual intended use because of such a trade-off relationship that the values of (R,G,B) are easily saturated with large values (in other words, nearly one) and the output image is subject to the blocked-up shadows with small values (in other words, nearly zero). Unlike the first embodiment, the processing step of multiplication is added in the second embodiment, but the increase in the processing load can be suppressed by setting the fixed coefficient that requires only bit shift processing.

$$R = 1.000 \times Y + 1.402 \times V \quad (17)$$

$$G = 1.000 \times Y - 0.344 \times U - 0.714 \times V \quad (18)$$

$$B = 1.000 \times Y + 1.772 \times U \quad (19)$$

It should be noted that when the luminance signals YL and YS are multiplied by the fixed coefficient, it is desired that the coefficient be set so that the luminance signal YL of the long exposure image (IL) is attenuated more intensely. This is because the value of the luminance signal YL of the long exposure image (IL) tends to be larger than the value of the luminance signal YS of the short exposure image (IS).

According to the second embodiment of this invention described above, in addition to the effects described in the above-mentioned first embodiment, the values of (R,G,B) are hardly saturated. Accordingly, it is possible to convert the image in the YUV color space into the image in the RGB color space, to thereby generate an image signal suitable for performing processing such as displaying or printing.

The first embodiment and the second embodiment are described above by taking the example of obtaining one output image from one long exposure image and one short exposure image for the sake of brevity of description, but this invention is not limited thereto. Further, the first embodiment and the second embodiment are described above by taking the example of generating the output image at the frame rate lower than the frame rate (image pickup frame rate) used to obtain the original image, but this invention is not limited thereto.

Figure 9:
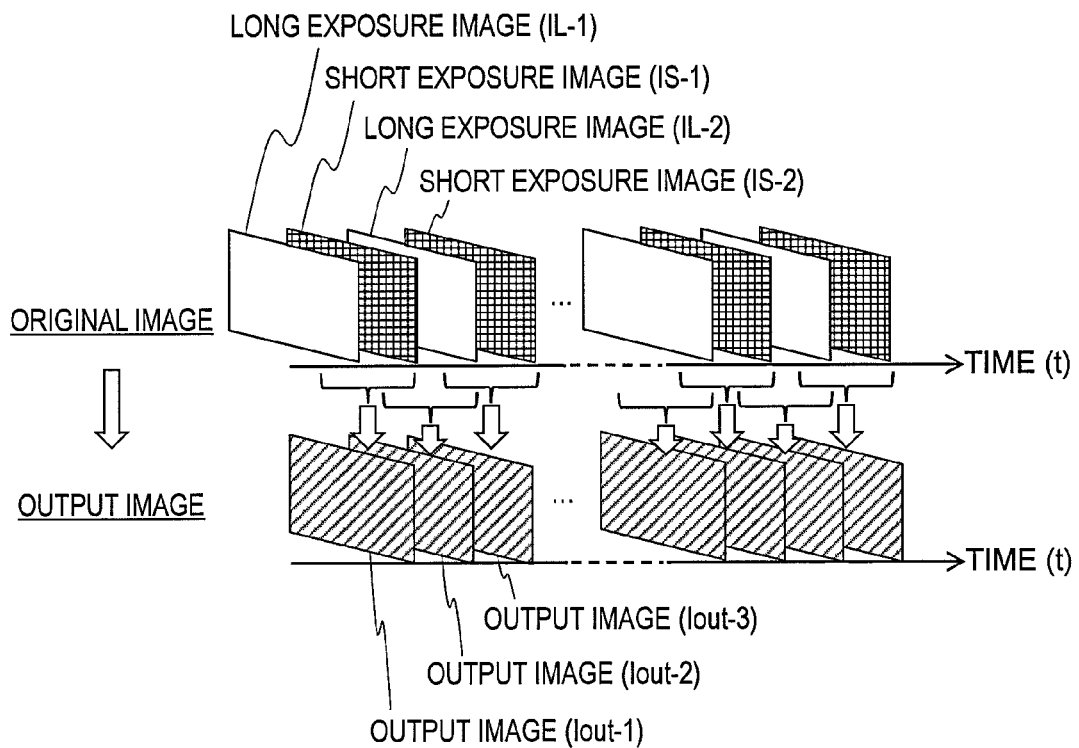
FIG. 9 is a diagram illustrating generation of an output image corresponding to each images included in a pair of a short exposure image and a long exposure image which are exposed at consecutive timings.

First, an example in which the frame rate used to generate the output image is set to be the same as the image pickup frame rate is described with reference to FIG. 9. The first embodiment and the second embodiment are described by taking the example in which one output image (Iout) is generated by using the long exposure image (IL) and the short exposure image (IS) obtained by picking up an image thereafter. In contrast, in FIG. 9, an output image (Iout-1) is generated by using a long exposure image (IL-1) picked up at a given timing and a short exposure image (IS-1) picked up at a later timing. This point is the same as the description made so far. However, this example is different from the first embodiment or the second embodiment in that an output image (Iout-2) is generated by using a long exposure image (IL-2) picked up at a further later timing and the short exposure image (IS-1) picked up at the above-mentioned later timing. In other words, the output images are generated in such a manner that the output image (Iout-1) is generated from the long exposure image (IL-1) and the short exposure image (IS-1), the output image (Iout-2) is generated from the short exposure image (IS-1) and the long exposure image (IL-2), an output image (Iout-3) is generated from the long exposure image (IL-2) and a short exposure image (IS-2) . . . . In other words, the output image is generated so as to correspond to each of a combination of the long exposure image and the short exposure image and a combination of the short exposure image and the long exposure image, each of the combinations being obtained by picking up original images at temporally consecutive image pickup timings. In this manner, the output image can be generated at the same frame rate as the image pickup frame rate.

Figure 10:
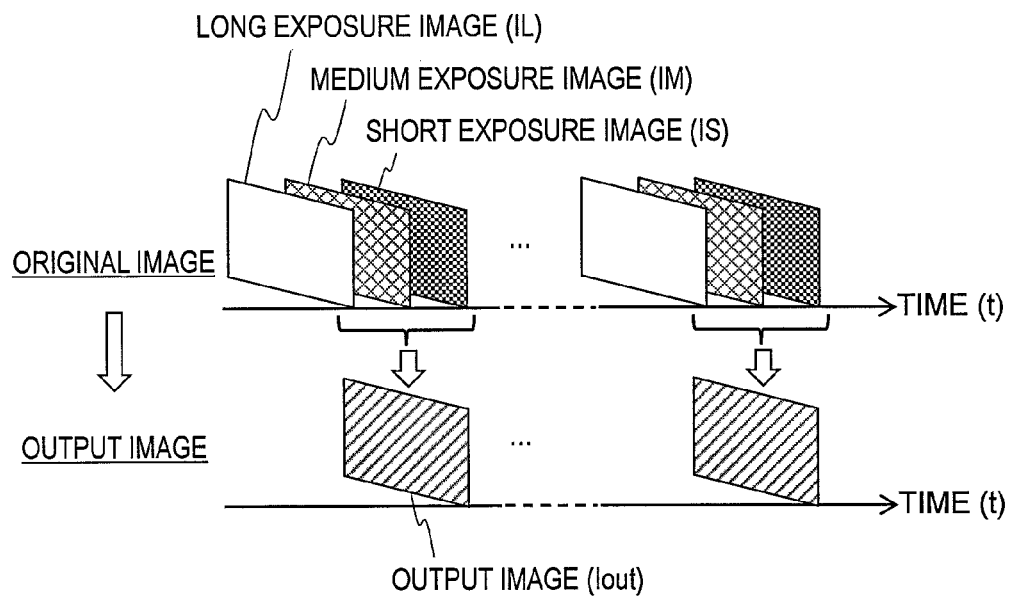
FIG. 10 is a diagram illustrating generation of an output image corresponding to a set of three original images having different exposure levels.

Subsequently, an example in which one output image is generated from three original images is described with reference to FIG. 10. The image pickup part 102 illustrated in FIG. 3 picks up the image of the subject repeatedly with three different exposure levels. In FIG. 10, the images obtained by picking up the images of the subject with those three different exposure levels are referred to as "long exposure image (IL)", "medium exposure image (IM)", and "short exposure image (IS)". Further, the YUV signals corresponding to the long exposure image (IL), the medium exposure image (IM), and the short exposure image (IS) are set as (YL,UL,VL), (YM,UM,VM), and (YS,US,VS).

The composite processing part 106 obtains the absolute values of each of the color difference signals (UL,VL), (UM,VM), and (US,VS) within three input images, compares the obtained absolute values among UL, UM, and US, and further compares the obtained absolute values among VL, VM, and VS. Then, the signal having the largest absolute value among UL, UM, and US is set as UO, and the signal having the largest absolute value among VL, VM, and VS is set as VO.

To obtain the signal having the largest absolute value from among three signals, it suffices that the processing of Step S700 and the processing of Step S702 within the flowchart of FIG. 7 are each repeated twice. In the first processing, the color difference signal (UL,VL) of the long exposure image (IL) and the color difference signal (UM,VM) of the medium exposure image (IM) are compared with each other. In the second processing, each of the absolute values of the color difference signal (UL or UM, VL or VM) selected in the first processing and each of the absolute values of the color difference signal (US,VS) of the short exposure image (IS) are compared with each other. In this manner, the signal having the largest absolute value among UL, UM, and US and the signal having the largest absolute value among VL, VM, and VS can be determined as UO and VO, respectively.

Further, with regard to a luminance signal, a luminance value other than the luminance value (YL) of the long exposure image (IL) having the highest exposure level among YL, YM, and YS, in other words, in this example, YM or YS can be set as YO. At this time, when a comparison is made between a case of using a luminance signal (YM) of the medium exposure image (IM) and a case of using a luminance signal (YS) of the short exposure image (IS), the former case tends to cause the blown-out highlights, and the latter case tends to cause the blocked-up shadows. Accordingly, any one thereof may be selected in accordance with intended use of the generated output image or the like. In addition, any one of the three luminance signals (YL, YM, and YS) including the luminance signal (YL) of the long exposure image (IL) can be selected as the luminance value (YO) of the output image. At this time, for the reason described in the second embodiment, it is desired that YO be derived by multiplying an attenuation coefficient determined based on which luminance value of the image obtained at which exposure level is to be used.

In this manner, by increasing the number of original images having different exposure levels, it is possible to handle the subject exhibiting a larger contrast. For example, in the above-mentioned applied example, it is possible to generate the image that allows the red color of the taillight to be determined more clearly regardless of whether the following distance from the leading vehicle is close or far.

In the above description with reference to FIG. 10, the long exposure image (IL), the medium exposure image (IM), and the short exposure image (IS) are obtained in any temporal image pickup order. For example, the images may be picked up so as to obtain the short exposure image (IS), the medium exposure image (IM), and the long exposure image (IL) in the stated order, or the images may be picked up so as to obtain the medium exposure image (IM), the short exposure image (IS), and the long exposure image (IL) in the stated order. Further, the number of kinds of exposure level according to the embodiments of this invention is not limited to the above-mentioned two kinds or three kinds, but may naturally be at least four kinds. In this case, any exposure order can be set.

In addition, FIG. 10 illustrates the example in which the frame rate of the output image is ⅓ of the image pickup frame rate, but it is possible to suppress the reduction in the frame rate of the output image by using the same method as described with reference to FIG. 9. Here, the images picked up at the first timing, the second timing, and the third timing from a given time point are set as the long exposure image (IL-1), the medium exposure image (IM-1), and the short exposure image (IS-1), respectively. Further, the images picked up at the following fourth timing, the fifth timing, and the sixth timing are set as the long exposure image (IL-2), the medium exposure image (IM-2), and the short exposure image (IS-2), respectively. The output image (Iout-1) to be generated first can be generated by using the long exposure image (IL-1), the medium exposure image (IM-1), and the short exposure image (IS-1). The output image (Iout-2) to be generated next can be generated by using the medium exposure image (IM-1), the short exposure image (IS-1), and the long exposure image (IL-2). In this manner, by using the image data obtained with three kinds of exposure level such as (long exposure, medium exposure, and short exposure), (medium exposure, short exposure, and long exposure), or (short exposure, long exposure, and medium exposure) that are performed at the consecutive timings, it is possible to generate the output image at the same rate as the image pickup frame rate. The same applies to a case where the number of kinds of exposure level is increased to at least four. In other words, by using the image data obtained with N kinds of exposure level performed at the consecutive timings, it is possible to generate the output image at the same frame rate as the image pickup frame rate.

Further, the above description is made with reference to FIG. 10 by taking the example in which one (one-frame) output image is generated so as to correspond to N (N-frame) original images obtained with the different exposure levels, but a plurality of output images may be generated. For example, a description is made of a case where the original images are obtained at three kinds of exposure level of the long exposure, the medium exposure, and the short exposure. In this case, a first output image can be generated from two original images of the long exposure and the medium exposure. Then, a second output image can be generated from two original images of the medium exposure and the short exposure. The first output image and the second output image can be properly used when the subsequent image recognition processing or the like is performed by using the output image in accordance with details of the image recognition processing or the like or a luminance distribution of the subject. In this example, the first output image tends to have a high exposure level, and is therefore suitable for a purpose that allows the color of the subject exhibiting a low luminance to be distinguished satisfactorily. Further, the second output image tends to have a low exposure level, and is therefore suitable for a purpose that allows the color of the subject exhibiting a high luminance to be distinguished satisfactorily.

The above description is made of this invention by taking as an example the case of generating the output image that can clearly reproduce the red color of the taillight of the leading vehicle at nighttime, but this invention is not limited thereto. For example, this invention can be used for a purpose of, for example, identifying the green color, the yellow color, and the red color of a traffic light or identifying a coating color of the vehicle, the color of a person's clothes, the color of a building, or the like at nighttime. In this manner, it is possible to generate the image suitable for the purpose of accurately distinguishing the color so as to correspond to the subject having a high contrast.

The above description is directed to the example in which, when the color component signals of the output image are derived based on the result of comparing the color component signals within the original image signal, the image in the RGB color space is converted into the image in the color space of YUV, YCbCr, Y(B−Y)(R−Y), or YPbPr to compare the color difference signals with each other. With regard thereto, the image in the RGB color space may be converted into the image in the color space of HSV (HSL), La*b*, or the like. For example, when the image in the RGB color space is converted into the image in an HSV color space, with regard to the plurality of images obtained at the different exposure levels, the signals in the corresponding pixel position are compared with each other between S signals serving as the color components, and the output image can be generated by selecting the signal that produces a higher chroma. As the luminance component signal, in the same manner as L signals described in the first embodiment and the second embodiment, a V signal of any one of the short exposure image and the long exposure image can be used, and the V signal multiplied by the attenuation coefficient may be set as the luminance component signal of the output image as necessary. It should be noted that with regard to an H signal, the H signal of the short exposure image that hardly causes the color saturation can be used. Further, when the image in the RGB color space is converted into the image in the color space of La*b*, with regard to the plurality of images obtained at the different exposure levels, the signals in the corresponding pixel position are compared with each other between an a* signal and a b* signal that serve as the color components, and the a* signal or the b* signal having the larger absolute value can be set as the color component signal of the output image. As the luminance component signal, in the same manner as the L signals described in the first embodiment and the second embodiment, the L signal of any one of the short exposure image and the long exposure image can be used, and the L signal multiplied by the attenuation coefficient may be set as the luminance component signal of the output image as necessary.

The above description is directed to the example of processing the moving image generated by the image pickup part in real time, but the image data accumulated in the storage apparatus may be processed after the image pickup. Further, the image to be processed may be a moving image or may be a still image. When the image data accumulated in the storage apparatus is processed after the image pickup, the image processing apparatus may be configured separately from the image pickup apparatus. At this time, the image processing apparatus may be realized by at least one of dedicated hardware, firmware, or the like, or may be realized by a program for executing a processing procedure described with reference to FIG. 7 and a computer that can execute the program.

While the present invention has been described in detail and pictorially in the accompanying drawings, the present invention is not limited to such detail but covers various obvious modifications and equivalent arrangements, which fall within the purview of the appended claims.

What is claimed is:

1. An image processing apparatus for processing an original image that is picked up, comprising:
    an image input part for inputting N original images having different exposure levels, where N is an integer of two or more, which are obtained by picking up images of the same subject in one of a simultaneous manner and a time-series manner; and
    a composite processing part for generating M output images, where M is an integer of one or more and less than N, by composing the N original images, wherein the composite processing part compares color component signals in each corresponding pixel position with each other between the N original images, and sets the color component signal that produces a higher chroma as a color component signal in each pixel position of the output image
    wherein the composite processing part compares between first color difference signals included in the color component signal and between second color difference signals included in the color component signal when comparing the color component signals with each other between the N original images, and sets a combination of color difference signals having larger absolute values as the color component signal in the each pixel position of the output image.

2. The image processing apparatus according to claim 1, wherein the composite processing part processes, as the original image, a signal expressed in any one of color spaces of YUV, YCbCr, and YPbPr.

3. The image processing apparatus according to claim 2, wherein the composite processing part sets a luminance component signal included in a signal in each corresponding pixel position within one original image selected from among (N−1) original images obtained by excluding an original image having a highest exposure level from the N original images, as a luminance component signal in the each pixel position of the output image.

4. The image processing apparatus according to claim 2, wherein the composite processing part sets a signal obtained by multiplying a luminance component signal comprised in a signal in each corresponding pixel position within one original image selected from among the N original images by a predetermined attenuation coefficient, as a luminance component signal in the each pixel position of the output image.

5. An image pickup apparatus for processing an original image that is picked up, comprising:
    an image pickup part for picking up images of the same subject in one of a simultaneous manner and a time-series manner, and generating N original images having different exposure levels, where N is an integer of two or more;
    an image input part for inputting the N original images generated by the image pickup part;
    a conversion processing part for converting the N original images into an image comprising a luminance component signal and a color component signal; and
    a composite processing part for generating M output images, where M is an integer of one or more and less than N, by composing the N original images converted by the conversion processing part,
    wherein the composite processing part compares color component signals in each corresponding pixel position with each other between the N original images, and sets the color component signal that produces a higher chroma as a color component signal in each pixel position of the output image; and
    wherein the composite processing part compares between first color difference signals included in the color component signal and between second color difference signals included in the color component signal when comparing the color component signals with each other between the N original images, and sets a combination of color difference signals having larger absolute values as the color component signal in the each pixel position of the output image.

6. The image pickup apparatus according to claim 5, wherein the composite processing part processes, as the original image, a signal expressed in any one of color spaces of YUV, YCbCr, and YPbPr.

7. The image pickup apparatus according to claim 6, wherein the composite processing part sets a luminance component signal included in a signal in each corresponding pixel position within one original image selected from among (N−1) original images obtained by excluding an original image having a highest exposure level from the N original images, as a luminance component signal in the each pixel position of the output image.

8. The image pickup apparatus according to claim 6, wherein the composite processing part sets a signal obtained by multiplying a luminance component signal comprised in a signal in each corresponding pixel position within one original image selected from among the N original images by a predetermined attenuation coefficient, as a luminance component signal in the each pixel position of the output image.

9. A non-transitory machine-readable storage medium containing at least one sequence of instructions for image processing by a computer,
    the computer including a processor for performing arithmetic operation processing, a storage part coupled to the processor, and an interface coupled to the processor,
    the instructions that, when executed, cause the computer to execute:
    a step of inputting N original images having different exposure levels, where N is an integer of two or more, which are obtained by picking up images of the same subject in one of a simultaneous manner and a time-series manner; and
    a composite processing step of generating M output images, where M is an integer of one or more and less than N, by composing the N original images, comparing color component signals in each corresponding pixel position with each other between the N original images, and setting the color component signal that produces a higher chroma as a color component signal in each pixel position of the output image; and wherein the composite processing step includes comparing between first color difference signals included in the color component signal and between second color difference signals included in the color component signal when comparing the color component signals with each other between the N original images, and setting a combination of color difference signals having larger absolute values as the color component signal in the each pixel position of the output image.

10. The non-transitory machine-readable storage medium according to claim 9, wherein the composite processing step includes processing, as the original image, a signal expressed in any one of color spaces of YUV, YCbCr, and YPbPr.

11. The non-transitory machine-readable storage medium according to claim 9, wherein the composite processing step includes setting a luminance component signal included in a signal in each corresponding pixel position within one original image selected from among (N−1) original images obtained by excluding an original image having a highest exposure level from the N original images, as a luminance component signal in the each pixel position of the output image.

12. The non-transitory machine-readable storage medium according to claim 9, wherein the composite processing step includes setting a signal obtained by multiplying a luminance component signal comprised in a signal in each corresponding pixel position within one original image selected from among the N original images by a predetermined attenuation coefficient, as a luminance component signal in the each pixel position of the output image.

\* \* \* \* \*